(No Model.) 3 Sheets—Sheet 1.

C. & F. PIETSCHMANN.
HAND ORGAN.

No. 307,222. Patented Oct. 28, 1884.

WITNESSES:
A. Schehl
Otto Risch

INVENTORS
Carl Pietschmann
Ferdinand Pietschmann
BY
Goepel & Raegener
ATTORNEYS.

(No Model.) 3 Sheets—Sheet 2.

C. & F. PIETSCHMANN.
HAND ORGAN.

No. 307,222. Patented Oct. 28, 1884.

WITNESSES:
A. Schehl.
Otto Risch.

INVENTORS
Carl Pietschmann
Ferdinand Pietschmann
BY
Goepel & Raegener
ATTORNEYS.

(No Model.) 3 Sheets—Sheet 3.

C. & F. PIETSCHMANN.
HAND ORGAN.

No. 307,222. Patented Oct. 28, 1884.

WITNESSES:
A. Schehl.
Otto Risch.

INVENTORS
Carl Pietschmann
Ferdinand Pietschmann
BY
Goepel & Raegener
ATTORNEYS.

United States Patent Office.

CARL PIETSCHMANN AND FERDINAND PIETSCHMANN, OF BERLIN, GERMANY.

HAND-ORGAN.

SPECIFICATION forming part of Letters Patent No. 307,222, dated October 28, 1884.

Application filed July 12, 1884. (No model.) Patented in Germany September 24, 1883, No. 24,074, and January 30, 1884, No. 25,745.

*To all whom it may concern:*

Be it known that we, CARL PIETSCHMANN and FERDINAND PIETSCHMANN, subjects of the King of Prussia, residing at the city of Berlin, Prussia, have invented certain new and useful Improvements in Hand-Organs, (for which we have obtained a patent in the German Empire, No. 24,074, dated September 24, 1883, and supplemental patent No. 25,745, dated January 30, 1884,) of which the following is a specification.

Our invention refers to improvements in hand-organs; and it consists in the combination, in a hand-organ, of a rotating wind-chest, carrying the reeds and actions, with a disk-shaped music-sheet having concentric perforations for actuating the key-levers, and a grooved abutment for the music-sheet. The abutment may be made either as a part of the cover and arranged with concentric grooves above the projections of the music-disk or it may be rotated with the wind-chest over the perforated disk.

Figure 1:
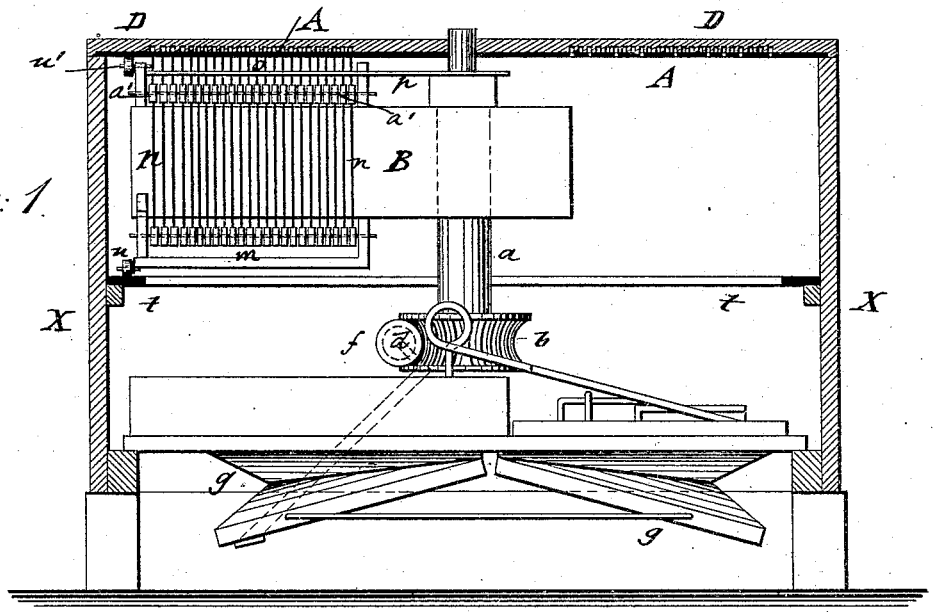
Figure 2:
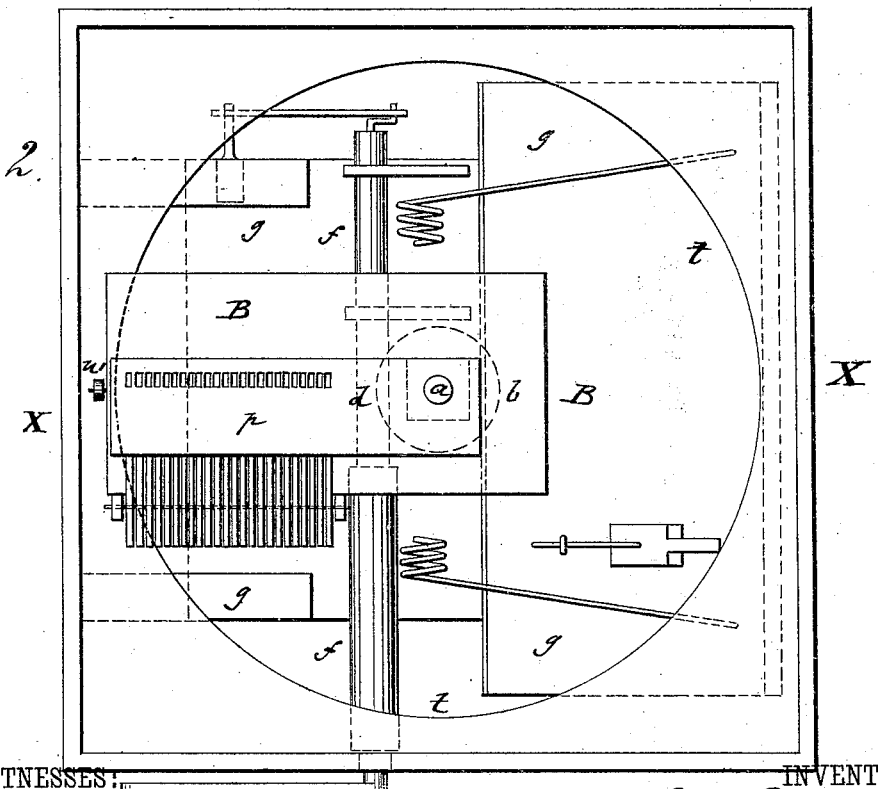
Figure 3:
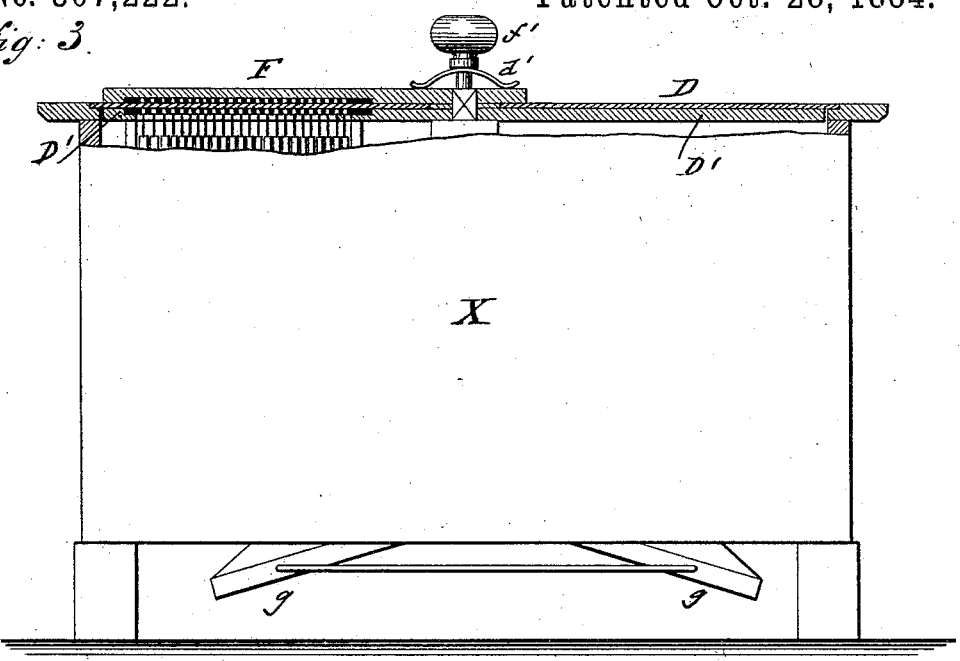
Figure 4:
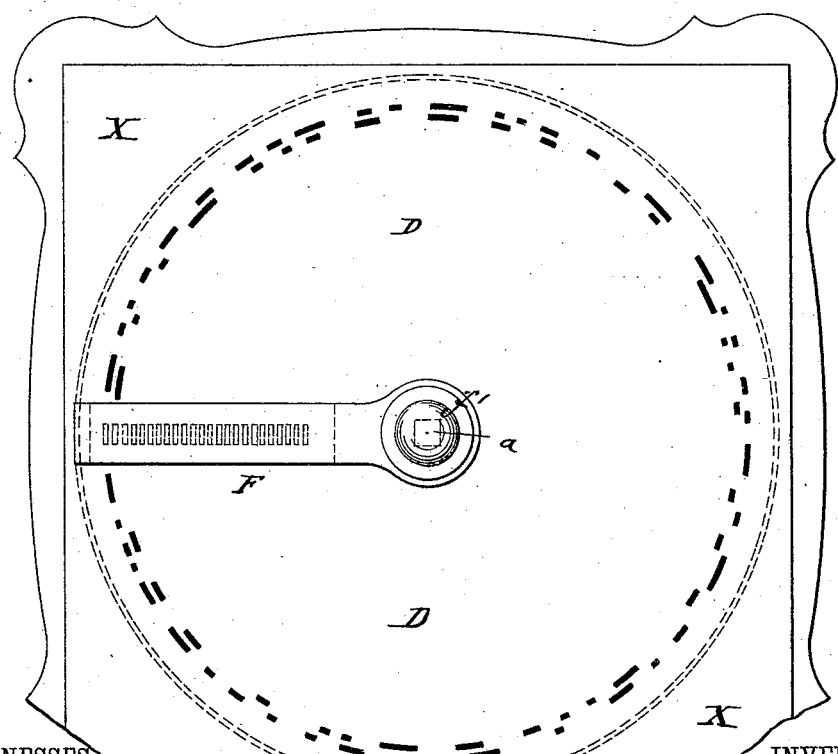
Figure 5:
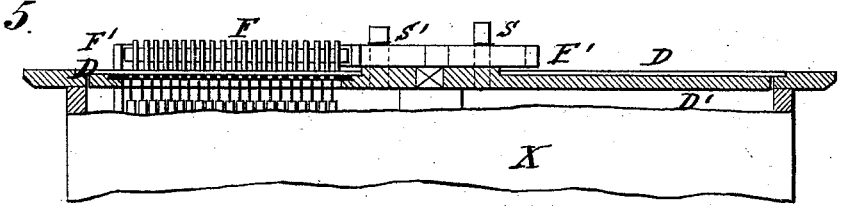
Figure 7:
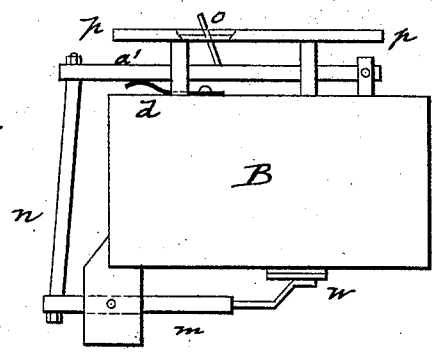
Figure 6:
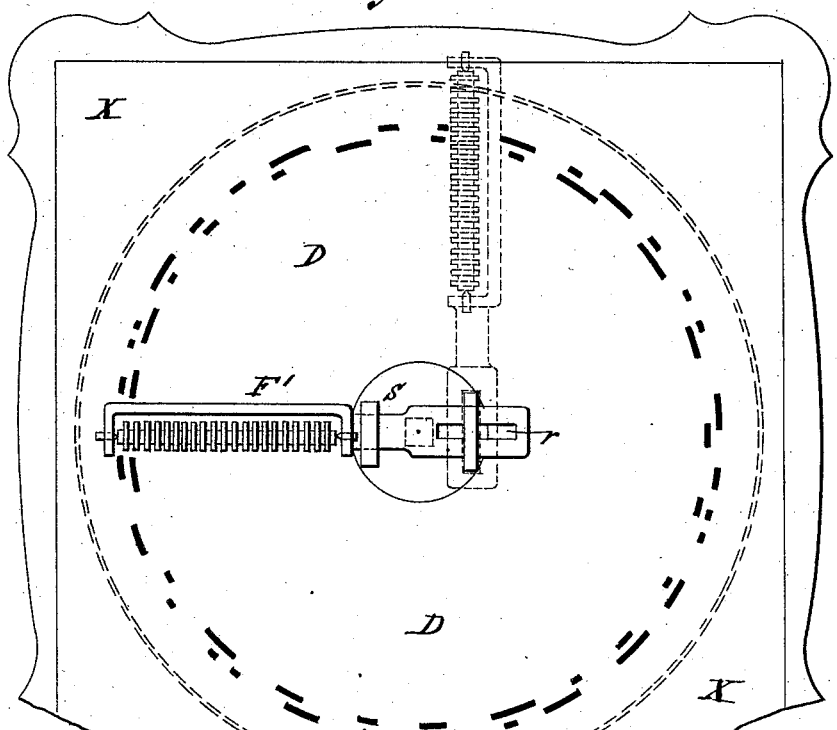

In the accompanying drawings, Figure 1 is a vertical longitudinal section of our improved hand-organ. Fig. 2 is a plan of the same with the cover removed. Figs. 3 and 4 are a side elevation and plan, partly in section, of a modified construction. Figs. 5 and 6 are a vertical side elevation and a plan of another modification, and Fig. 7 is a detail end view of the wind-chest and the valve action of the reeds.

Similar letters of reference indicate corresponding parts.

In the drawings, X is the casing of our improved hand-organ; a, a vertical hollow shaft that turns in bearings of the cover D and in step-bearings of the casing, and b a worm-wheel secured to the shaft a.

f is a horizontal shaft properly supported in the casing, and provided with a hand-crank, f', at the outer end. The shaft f' carries a worm, d, which meshes with the worm-wheel b and transmits motion to the shaft a.

g g are bellows which receive motion from the shaft f in the usual manner and deliver compressed air through the hollow shaft a to a wind-chest, B, that is attached to said shaft. The reeds and their actions are arranged on the wind-chest, as shown in Figs. 1 and 7.

The wind-chest B consists of a rectangular box, which is secured to the shaft a and rotated therewith.

w represents the valves covering the reeds; m the valve-levers, which are fulcrumed to a common axis.

a' are the key-levers, which are pivoted to the top of the wind-chest; n, connecting-rods which extend from the key-levers to the valve-levers.

d d are springs which force the key-levers in upward direction.

o are pins projecting upward from the keys, and p is a slotted guide-piece at the top of the wind-chest for guiding the pins o, as shown clearly in Fig. 7.

D represents the cover of the casing X, which cover is provided at its under side with a series of concentric grooves, as shown in Fig. 1. These grooves are located vertically above the pins o of the key levers.

Below the cover D is located the disk-shaped music-sheet A, which has a series of perforations arranged in concentric lines vertically below the concentric grooves of the cover D. The music-disk A is held rigidly in position below the cover D, and serves to actuate the key-levers as the pins of the same pass along the perforations of the music-disk. The wind-chest B has guide-rollers u u' at the outer end, which move, respectively, on a circular track, t, at the interior of the casing X and on the metallic music-disk A, as shown in Fig. 1. When, by turning the crank f' of the shaft f, the shaft a and the wind-chest B are rotated, the pins o, which project from the key-levers, bear against the lower surface of the perforated disk A, and keep thereby the valves W closed; but as soon as the pins o arrive at the perforations or holes of the disk they enter the same and are forced up by the action of the springs d so as to project into the corresponding annular groove of the cover D.

By properly arranging the size and position of the holes in the music-disk A any tune may be produced, while for changing the tune it becomes necessary to change the disk or card in the same manner as in other mechanical instruments. When the music-box is arranged below the cover of the casing, the cover D serves as an abutment or support for the same, so that it is enabled to resist the pressure exerted thereon by the pins $o$ of the key-levers.

It is obvious that throughout the rotation of the wind-chest the cover serves as an abutment for the part of the music-sheet at which the action is located at the time.

In place of a stationary abutment, a movable abutment may be used, which is attached to the shaft $a$, and which extends vertically above the wind-chest over the music-disk. Such an arrangement is shown in Figs. 3 and 4, in which A' represents the music-disk, and F the abutment, which is fastened to the shaft $a$, and provided with grooves. (Shown in dotted lines in Fig. 4.) These grooves take the place of the previously-described concentric grooves of the cover.

D' is a disk below the music-disk A', which is attached to and rotated with the shaft $a$. The disk D' is provided with an opening, through which the pins $o$ pass to the music-disk. The abutment F is removably attached to the shaft $a$, so that the music-disks may be exchanged, a spring, $d'$, and a screw-button, $f'$, pressing against the music-disk.

To prevent the friction caused by the abutment F on the music-disk, the sliding surface may be replaced by a rolling surface. Such an arrangement is shown in Figs. 5 and 6, where F' is an arm, and F a grooved cylindrical roller or abutment, turning loosely in bearings of the arm F'. The grooves of the abutment are located vertically above the pins $o$ and the perforations of the music-disk, while the rings of the roller bear down upon the imperforate part of the music-disk.

As shown in Figs. 5 and 6, the arm F' has at its inner end a slot, $r$, which is passed over a pin, $s$, with an elongated head. The latter is then turned through an angle of ninety degrees, and the arm F' pushed beneath a hook, $s'$, which holds it down. The music-disk is secured to the box-cover by any suitable means, so as to be prevented from turning.

Instead of using one wind-chest, two or more may be used, each provided with reeds and valve actions, and the shaft $a$ may be arranged horizontally and the music-disk vertically.

Having thus described our invention, we claim as new and desire to secure by Letters Patent—

1. The combination of one or more rotating wind-chests carrying the reeds and valve actions, with a fixed music-disk having concentric lines of perforations, and an abutment above said disk, said abutment having grooves vertically above said perforations, substantially as set forth.

2. The combination of one or more rotating wind-chests carrying the reeds, valve-levers, and key-levers, a fixed music-disk having concentric lines of perforations, an abutment above said disk, having grooves vertically above said perforations, the projecting pins of the key-levers passing over the music-disk or entering said perforations and grooves, so as to close or open the valves of the reeds, substantially as specified.

3. The combination of one or more rotating wind-chests carrying the reeds, valves, and actuating-levers, a fixed concentrically-perforated music-disk, a cover having concentric grooves vertically above said perforations, and guide-rollers attached to the outer end of the wind-chest, and guided along a circular track, and the music-disk, substantially as described.

In testimony that we claim the foregoing as our invention we have signed our names in presence of two subscribing witnesses.

CARL PIETSCHMANN.
FERDINAND PIETSCHMANN.

Witnesses as to Carl Pietschmann:
  B. ROI,
  JOHN R. RUSLYN.
Witnesses as to Ferdinand Pietschmann:
  JOS. W. HARPER,
  EMIL HENZEL.